United States Patent [19]

Anderson et al.

[11] Patent Number: 4,847,972

[45] Date of Patent: Jul. 18, 1989

[54] VAN APPARATUS FOR HANDICAPPED PEOPLE AND METHOD OF MAKING SAME

[76] Inventors: Ronald G. Anderson, 4 Parkway Ter., Morris, Minn. 56267, by Yvonne M. Anderson, legal representative; Jeffrey S. Anderson, Rte. 1, Box 124, Cyrus, Minn. 56323; Charles R. Anderson, 904 Nevada Ave., Morris, Minn. 56267; Todd A. Anderson; Darren G. Anderson, both of 4 Parkway Ter., Morris, Minn. 56267

[21] Appl. No.: 127,248

[22] Filed: Dec. 1, 1987

[51] Int. Cl.[4] ...................... B21K 21/16; B62D 21/00; B60P 3/00; B60S 11/00

[52] U.S. Cl. .................................. 29/401.1; 280/790; 280/2; 296/25; 296/204; 414/921

[58] Field of Search .................. 29/401.1; 280/790, 2, 280/797, 800; 296/25, 29, 204; 414/921

[56] References Cited

U.S. PATENT DOCUMENTS

| | | | |
|---|---|---|---|
| 1,806,337 | 5/1931 | Dunlap | 280/2 |
| 1,972,224 | 9/1934 | Herman | 280/2 |
| 2,233,181 | 2/1941 | Quartullo | 296/25 |
| 3,847,292 | 11/1974 | Williams et al. | 414/921 |
| 3,941,261 | 2/1976 | Ricci | 296/25 |
| 4,099,313 | 7/1978 | Phillips | 29/416 |
| 4,231,144 | 11/1980 | Bernacchia, Jr. | 29/401.1 |
| 4,282,641 | 8/1981 | Phillips | 29/401.1 |
| 4,369,559 | 1/1983 | Phillips | 29/401.1 |
| 4,392,684 | 7/1983 | Yoshitsugu et al. | 296/185 |

FOREIGN PATENT DOCUMENTS

| | | | |
|---|---|---|---|
| 2491408 | 4/1982 | France | 414/921 |

OTHER PUBLICATIONS

Advertisement from Drive-Master Corporation; Montclair, New Jersey.

*Primary Examiner*—Bruce Y. Arnold
*Assistant Examiner*—Ronald M. Kachmarik
*Attorney, Agent, or Firm*—Merchant, Gould, Smith, Edell, Welter & Schmidt

[57] ABSTRACT

A van apparatus (20, 20') for the transportation of handicapped people having a bi-level floor surface supported by a frame rail (34, 34'), wherein the lower portion of said bi-level floor extends in a substantially level plane from an intermediate area to a forward area of said van apparatus, such that a handicapped person may drive or ride as the front passenger in said van apparatus. The lower portion of said bi-level floor may be lowered to a customized depth in the construction of each individual van apparatus. Methods for construction of such a van apparatus are also disclosed.

7 Claims, 6 Drawing Sheets

VAN APPARATUS FOR HANDICAPPED PEOPLE AND METHOD OF MAKING SAME

TECHNICAL FIELD OF THE INVENTION

The present invention relates to a van apparatus which may be used to transport handicapped people and methods of constructing the van apparatus.

BACKGROUND OF THE INVENTION

Current methods for transportation of handicapped people typically utilize a van which is of unacceptable design to many users because handicapped individuals being transported in the van are often uncomfortable. These individuals are uncomfortable because they are often required to bend their necks in a difficult position, so as to avoid contact with the ceiling of the van. Some handicapped individuals are unable to bend their necks at all. If a so-called "bubble-top" is provided on the van to avoid this difficulty, handicapped individuals being transported are unable to see out the windows of the van as well as other occupants, since their line of sight is higher than the van windows and is blocked by the "bubble-top." Having a van with the bubble-top creates more wind problems.

Further, many handicapped individuals are physically able to drive, but are prevented from doing so in most vans designed for the transport of people in wheelchairs because the construction of these vehicles makes it impossible for a wheelchair to be placed in close proximity to their steering wheels.

A vehicle which provides for the transportation of handicapped individuals such that they may see out van windows as well as other occupants is disclosed in U.S. Pat. No. 3,941,261, granted to Ricci on March 2, 1976. This patent, however, discloses a seemingly weak and structurally unsound method of providing the improved view. The Volkswagen minibus proposed by Ricci provides a lowered floor means 46 which is welded or otherwise affixed to frame pieces 35 and 36, but in addition to other differences the disclosed means does not provide for a structurally intact frame rail disposed beneath the lowered floor.

In addition, the apparatus taught by Ricci appears to have has no provision for a handicapped person's possible ability to drive the van, thus detracting from the liberty of a wheelchair-bound individual who is able to perform such an operation.

The present invention overcomes the aboveenumerated problems and other shortcomings associated with current vehicles used for the transportation of handicapped individuals.

SUMMARY OF THE INVENTION

The present invention relates to a van apparatus for handicapped people having a bi-level floor surface supported by a frame rail.

The present invention also relates to a van apparatus for handicapped people having a bi-level floor surface supported by a frame rail wherein the lower portion of said bi-level floor extends in substantially the same plane from an intermediate area to a forward area of said van apparatus, such that a handicapped person may drive or ride as the front passenger in said van apparatus.

The present invention further relates to a van apparatus for handicapped people having a bi-level floor surface supported by a frame rail wherein the lower portion of sid bi-level floor may be lowered to a customized depth in the construction of each individual van apparatus.

The present invention still further relates to a method of constructing a van apparatus for the transportation of handicapped people, comprising the steps of:

(a) placing a van body on a chassis after raising rear end portions of chassis frame rails extending longitudinally of the van body and after extending a midportion; the chassis midportion being where the frame rails are lower than at their front and rear portions;

(b) attaching said van body to said chassis;

(c) cutting a portion of floor from said van apparatus;

(d) lowering said floor portion to a desired depth so that said floor portion is supported by the frame rails which extend beneath the floor portion; and (e) placing a metal skirt substantially about a gap between said lowered floor portion and the remaining floor surface of said van apparatus.

In one embodiment of the present invention, the chassis is selected from one of an El Dorado Cadillac and Toronado Oldsmobile automobile manufactured between 1971 and 1976. Additionally, in still other embodiments customized mounting features are installed.

The present invention still further relates to another method of constructing a van apparatus for the transportation of handicapped people, comprising the steps (a) cutting portion of floor from said van apparatus;

(b) attaching a second frame rail to said van apparatus beneath an original frame rail;

(c) detaching said original frame rail of said van apparatus;

(d) lowering said floor portion a desired depth so that said floor portion is supported by the frame rail extending directly beneath the floor portion; and (e) placing a metal skirt substantially about a gap between said lowered floor portion and the remaining floor surface of said van apparatus.

In one embodiment, body mounts and vibration dampeners are disposed between the floor and the frame rails. An advantage of one embodiment of the present invention is its structurally sound and strong construction. The 14-gauge steel and reinforced welds used in modifications to the existing structures ensure that a customized van apparatus is stronger than the original vehicle.

Another advantage of one embodiment of the present invention lies in provisions for a handicapped individual to drive a van apparatus, thus allowing a wheelchair-bound person greater freedom of movement.

Yet another embodiment includes the steps of installing a transfer case for the transmission.

Yet another advantage of one embodiment of the present invention is elimination of the well located proximate the side doors of most vans.

An advantage of still another embodiment of the present invention is its capacity to be lowered approximately 14 inches, thus allowing taller individuals to be transported in the van apparatus.

Another advantage of an embodiment of the present is the elimination of the "doghouse" engine housing common to vans.

Yet another advantage of an embodiment of the present invention is the front-wheel drive, disc brakes and shock absorbers provided in customization, thus allowing a very comfortable ride to occupants of the van apparatus. The front-wheel drive feature provides for a much safer vehicle, particularly in winter-like conditions.

Still another advantage of an embodiment of the present invention is that the appearance of the van apparatus is like that of any standard van, not like the appearance of a handicapped van. The height of the van apparatus is under seven feet, which allows the van apparatus entrance in public parking ramps. The van apparatus can also be parked in standard-sized garages.

An advantage of another embodiment of the present invention is its easy alignment and construction.

Another advantage of an embodiment of the present invention is its relatively inexpensive construction requirements.

The above-described features and advantages, along with various other advantages and features of novelty, are pointed out with particularity in the claims annexed hereto and forming a part hereof. However, for a better understanding of the invention, its advantages, and objects attained by its use, reference should be had to the drawings which form a further part hereof and to the accompanying descriptive matter in which there is illustrated and described a preferred embodiment of the invention.

BRIEF DESCRIPTION OF THE DRAWINGS

In the drawings, in which like reference numerals indicate corresponding parts throughout the several views.

DETAILED DESCRIPTION OF EMBODIMENTS OF THE INVENTION

In the following detailed description of the preferred embodiments, reference is made to accompanying drawings which form a part hereof, and in which is shown by way of illustration specific embodiments in which the invention may be practiced. These embodiments are described in sufficient detail to enable those skilled in the art to practice the invention and it is to be understood that other embodiments may be utilized and that structural changes may be made without departing from the scope of the present invention. The following detailed description is, therefore, not to be taken in a limiting sense, and the scope of the present invention is defined by the appended claims.

Figure 1:
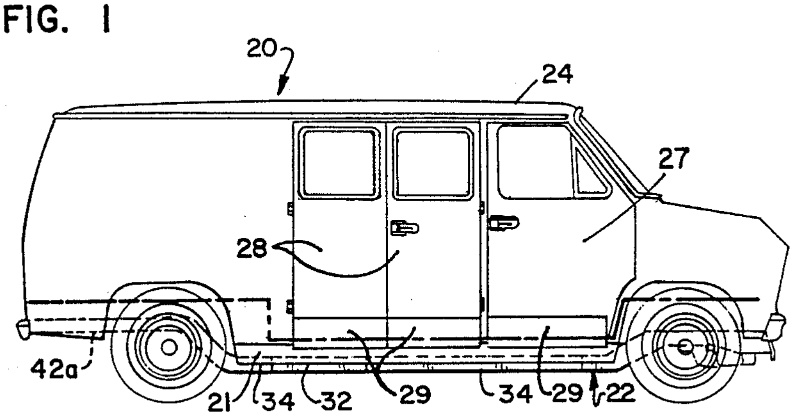
FIG. 1 is a side view of an embodiment of a van apparatus in accordance with the principles of the present invention.
Figure 2:
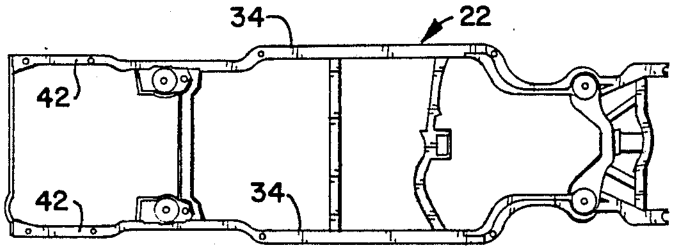
FIG. 2 is a top view of a General Motors chassis for use with a van apparatus in accordance with the principles of the present invention.
Figure 3:
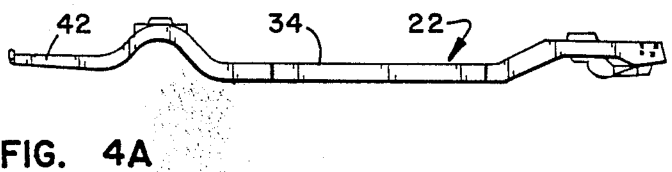
FIG. 3 is a side view of the General Motors ® chassis of FIG. 2.
Figure 4A:
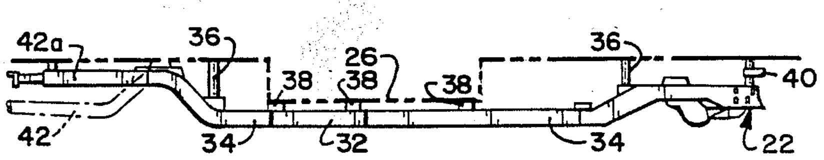
FIGS. 4A and 4B are a side view of the chassis of FIGS. 2 and 3 modified in accordance with the principles of the present invention, the modified van floor being shown in its lowered portion by phantom line.
Figure 4B:
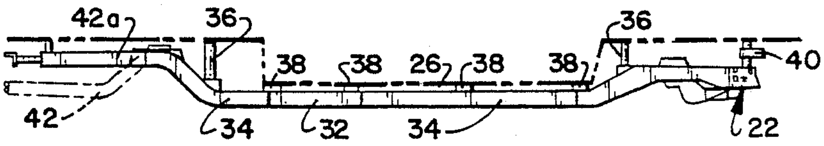

Referring now to the drawing, there is illustrated in FIGS. 1 through 8 an embodiment of a van apparatus 20 in accordance with the principles of the present invention. This embodiment of the invention utilizes a chassis 22 from an El Durado Cadillac or Toronado Oldsmobile General Motors ® automobile manufactured between 1971 and 1976, inclusive. The chassis 22 is detached from the body of such a Cadillac automobile, as shown in FIGS. 2 and 3, and modified for attachment to a van body 24.

Figure 5:
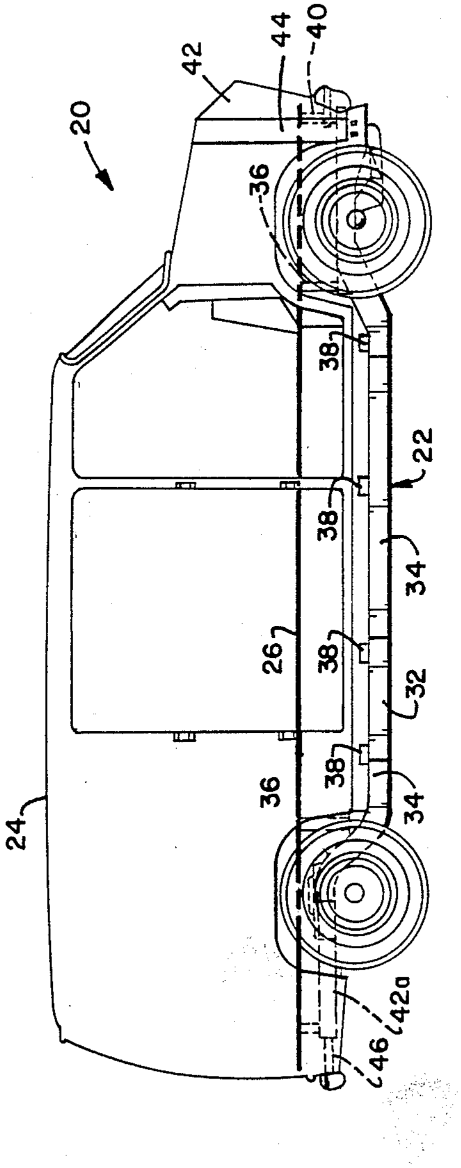
FIG. 5 is a side view of a van body mounted on the chassis of FIGS. 2 and 3 before the floor has been lowered to form a van apparatus in accordance with the principles of the present invention, the doors of the van body being removed.
Figure 6:
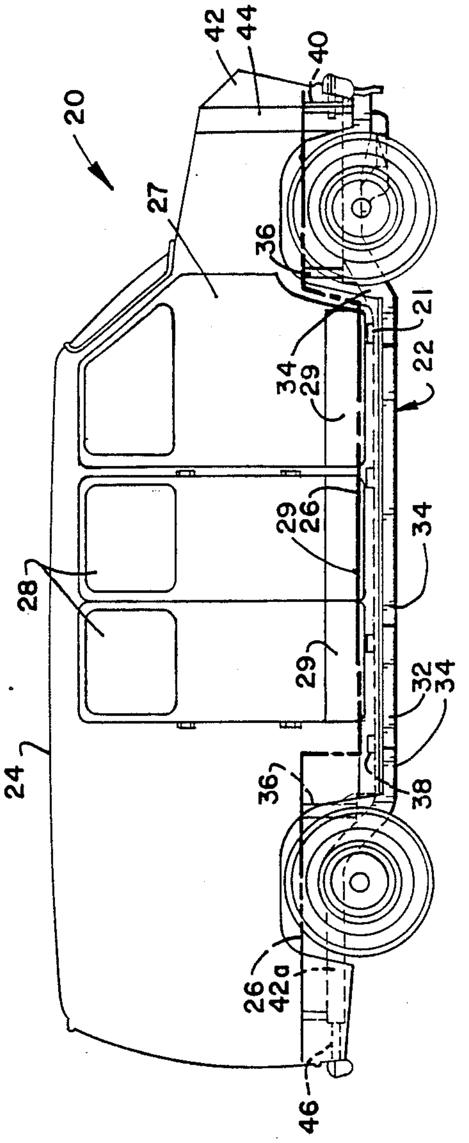
FIG. 6 is a side view of the van apparatus of FIG. 5, but with the floor surface cut away and lowered.
Figure 7:
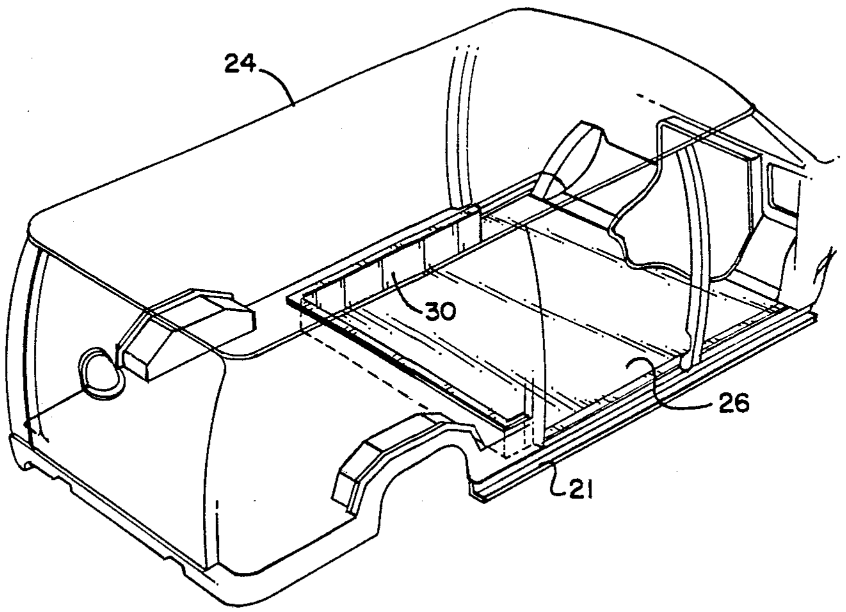
FIG. 7 is a partial perspective view of a van body for use with a van apparatus in a accordance with the principles of the present invention, in which the floor surface of said van body is lowered in a substantially level plane from an intermediate portion of the van body to the driver and passenger compartment proximate a forward area of said van body such as shown in FIG. 4B.
Figure 8:
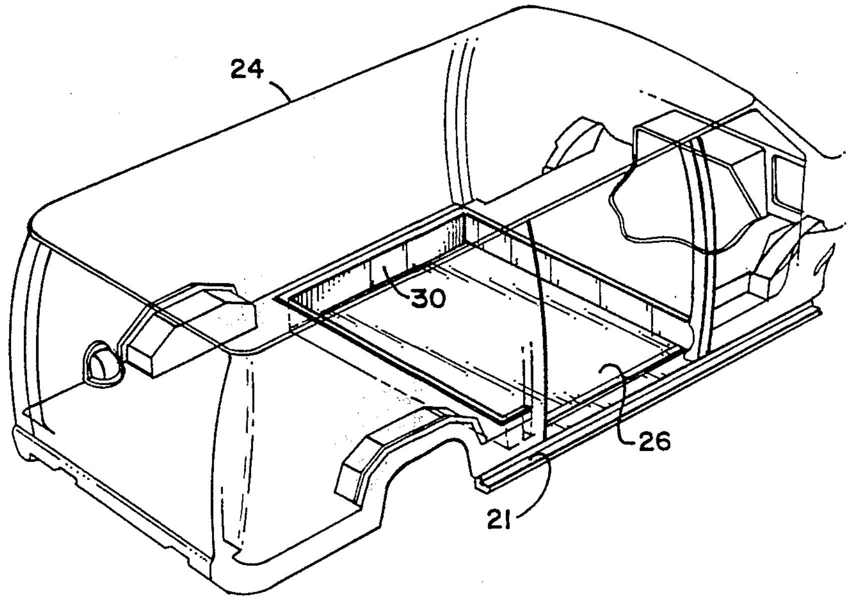
FIG. 8 is a partial perspective view similar to FIG. 7, except that the floor surface is lowered over a smaller area of the van body, that in the intermediate portion such as shown in FIG. 4A.
Figure 9:
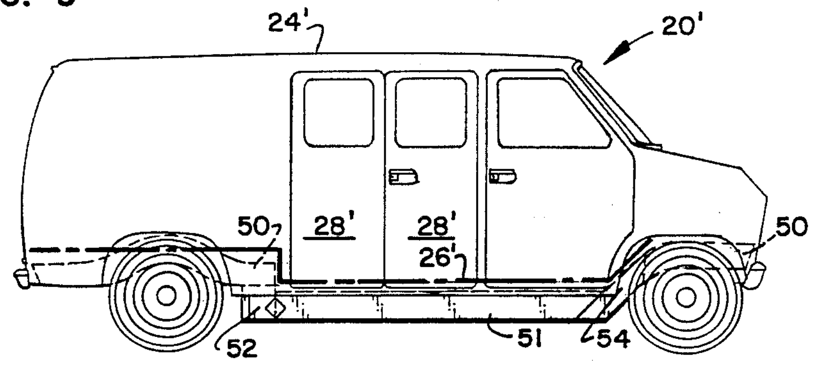
FIG. 9 is a side view similar to FIG. 1 of an alternate embodiment of a van apparatus in accordance with the principles of the present invention.

In performing such attachment, the van body 24 is aligned with and placed on the chassis 22 as generally illustrated in FIG. 5, then a portion of the floor 26 is cut from the van body 24 in a substantially flat plane parallel to the chassis 22. This floor portion 26 may cover an area of the van body 20 proximate the side doors 28 as illustrated in FIG. 8, or it may define a larger area. The larger area may extend, as illustrated in FIG. 7, from an area proximate the side doors 28 forward to the driver and front seat passenger compartment area normally occupied by a driver and front seat passenger, such that upon completion of the van apparatus 20, a wheelchair may be placed in either the driving or front seat passenger position, so that a handicapped individual may drive said van apparatus or ride as the front passenger. A seating arrangement wherein an ordinary car seat may be slid laterally along a track, such that a wheelchair may occupy either the driving or front passenger position while the ordinary car seat occupies the other space, may be provided.

After cutting, the floor portion 26 may be lowered to a position up to 14 inches beneath its previous location, and a metal skirt 30 placed substantially about the gap between the two positions. In the embodiment shown, the floor portion 26 has been lowered approximately 10 inches. It will be appreciated that no height has been added to the van apparatus 20, such that it maintains a height substantially the same as standard vans, commonly under seven feet.

Modifications which are required for the attachment of the chassis 22 to the van body 24 include: the addition through welding or similar means of two approximately 18-inch long pieces of metal 32 to the chassis frame rails 34, one on each side of the chassis 22 so as to lengthen the chassis 22; the fabrication of body mounts 36 and vibration dampeners 38 for the chassis 22; the fabrication of bumper mounts 40 and the raising of a rear portion 42 and welding on a portion 42a to provide a longer wheelbase and to support the rear floor surface of a van body 24. Preferably all the metal used in customized parts for both embodiments of the van apparatus 20 and 20' is 14-gauge steel and as such, is stronger than most materials used in original construction. In the preferred embodiment, side extensions 29 are suitably attached to the bottom edge portion of the van side wall and side doors 28 and 27 to extend downward to enclose the space between the bottom edge of the doors and the lowered floor portion 26.

After the chassis 22 has been modified as specified above, the van body 24 is aligned and placed on the chassis 22 and further modifications to the van apparatus 20 are made. These changes include: stretching hood and fender portions 42 and 44, respectively, of the van body 24 by adding various metal portions; lengthening the exhaust system 46 so it will discharge outside the van body 24; adapting the steering system of the van apparatus 20 to a rack-and-pinion type (not shown) because such a system occupies less engine space; and changing the cooling system of the van apparatus 20 to eliminate a mechanical fan and install two electric fans, again because of a reduced engine space requirement. These changes allow the elimination of the "doghouse" engine housing common to vans. Heavy-duty shock absorbers replace original shock absorbers for the van apparatus 20, and are installed in substantially the same locations. Other comfort provisions of this embodiment of the van apparatus 20 include front-wheel drive capability and disc brakes. These features are provided in the General Motors® engine and allow occupants of the van apparatus 20 a smoother ride. A running board step 21 is added along the bottom edge of the van.

In another embodiment of the current invention, in which like reference numbers indicate corresponding parts throughout the several views, there is disclosed in FIGS. 9 through 14 a van apparatus 20' in accordance with the principles of the current invention. This embodiment utilizes a second frame rail 51 which is identical to the original frame rail 50 of the van apparatus 20'. The process of creating the van apparatus 20' is similar to that employed in making the first embodiment of a van apparatus 20.

Figure 10:
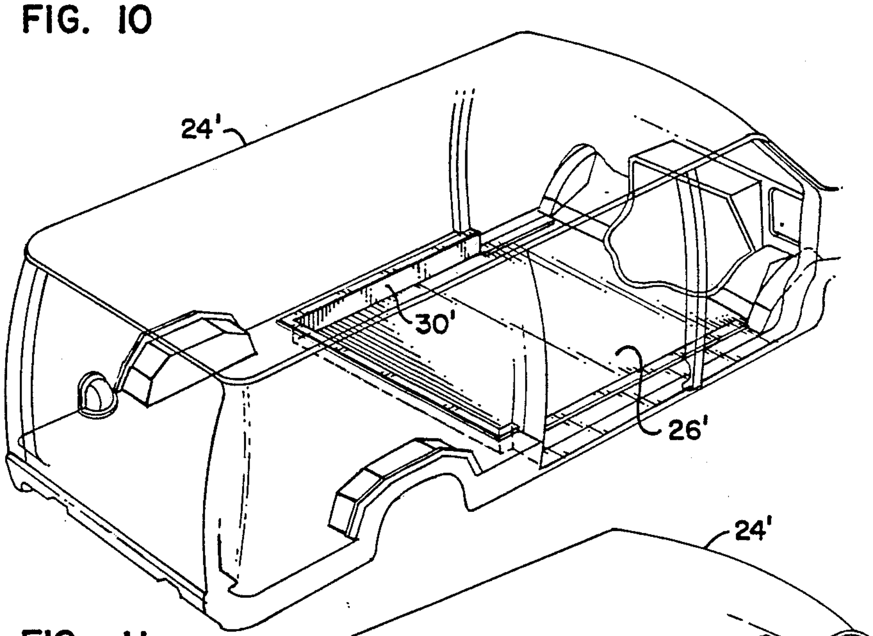
FIG. 10 is a view similar to FIG. 7, except that the lowered floor is depicted in the alternate embodiment shown in FIG. 9.
Figure 11:
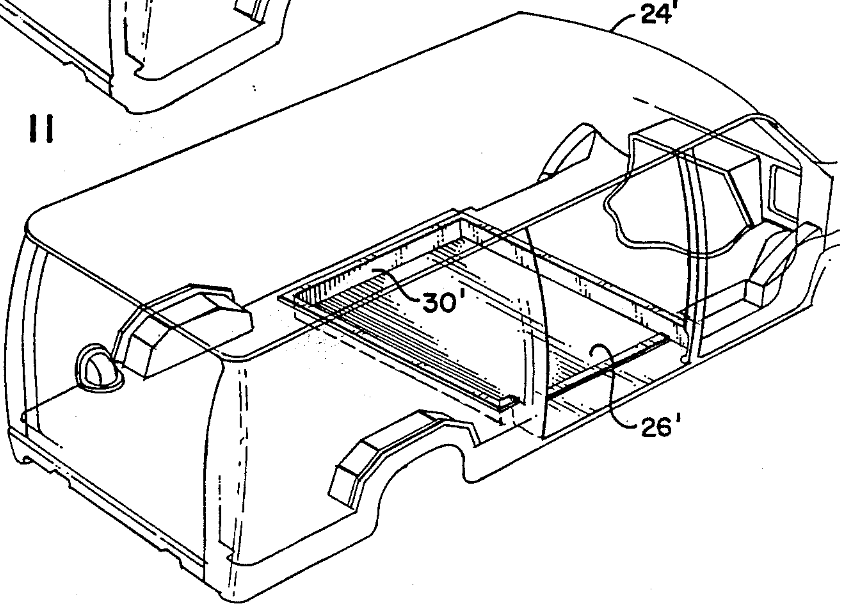
FIG. 11 is a view similar to FIG. 8, except that the lowered floor is depicted in the alternate embodiment shown in FIG. 9.
Figure 12:
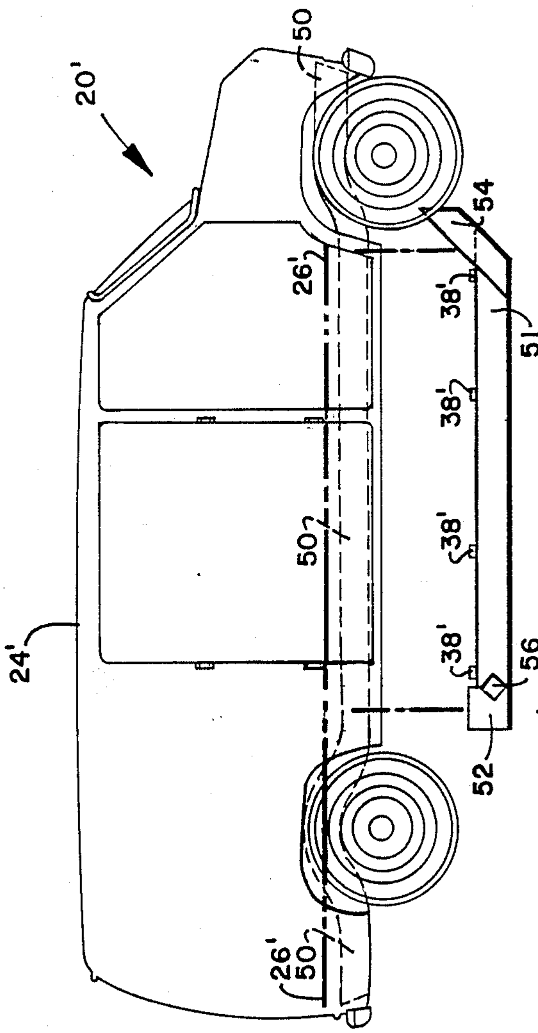
FIG. 12 is a side view of the alternate embodiment shown in FIG. 9, with its doors removed and depicting alignment of a second, customized frame rail with the chassis prior to attachment to the chassis.
Figure 13:
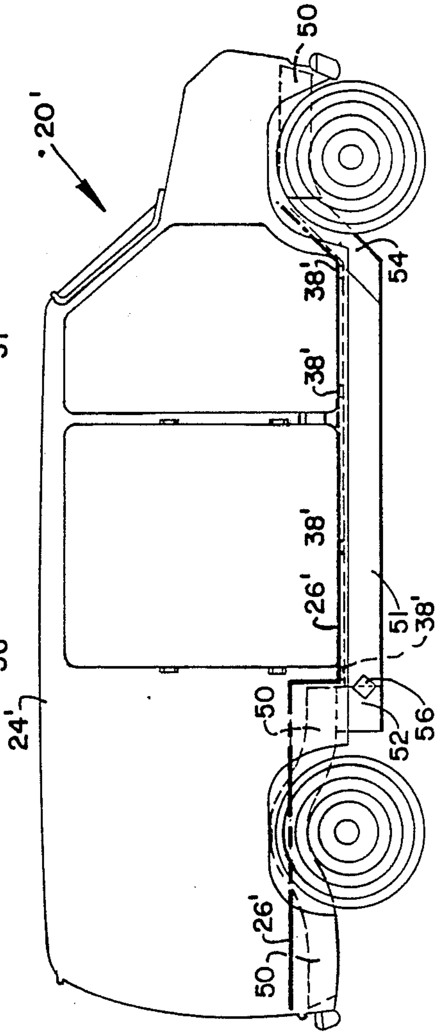
FIG. 13 is a side view similar to FIG. 12, except that the second frame rail is shown in attachment to the van body.
Figure 14:
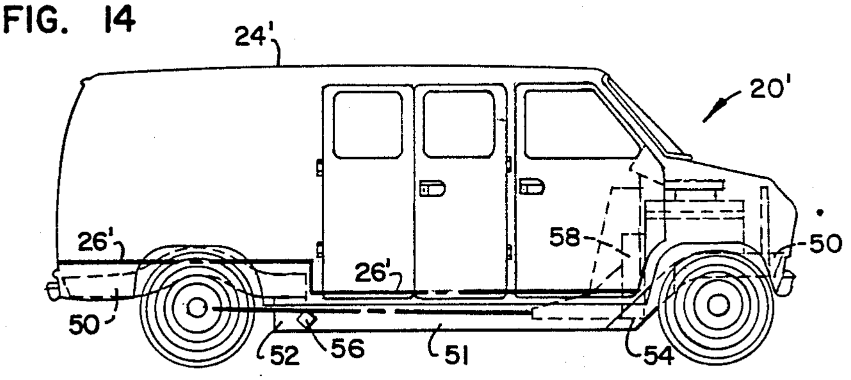
FIG. 14 is a slightly reduced side view similar to FIG. 13, except that the original frame rail for the van body has been detached and shows a transmission case.
Figure 15:
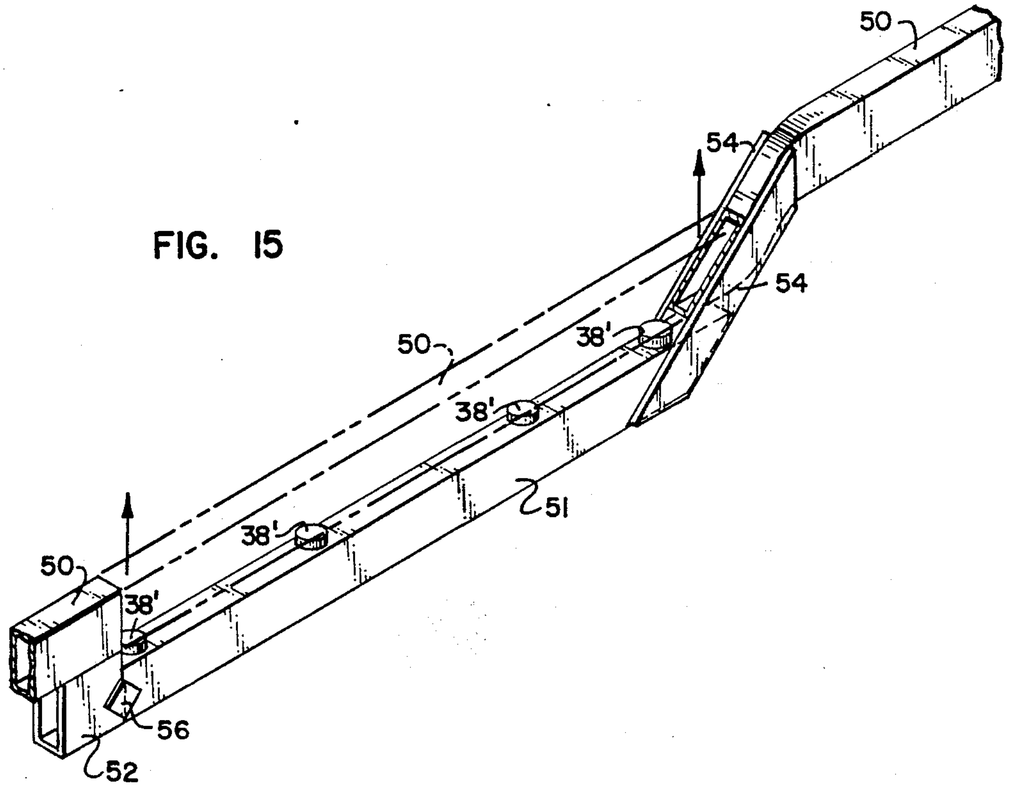
FIG. 15 is an enlarged, fragmentary view illustrating attachment of the second frame rail to the original frame rail.

First, a floor portion 26' is cut from a van body 24' in a substantially flat plane parallel to the original frame rail 50 of the van apparatus 20'. As in the first embodiment, the floor portion 26' may occupy a relatively small area proximate the side doors 28', or may extend forward to encompass a larger area, as shown in FIGS. 11 and 10, respectively. In addition, if the floor portion 26'extends forward to encompass the area in which the driver and front passenger of a van usually sit, a seating arrangement wherein an ordinary car seat may be slid laterally along a track, such that a wheelchair may occupy either the driving or front passenger position while the ordinary car seat occupies the other space, may be provided.

Second, an additional frame rail 51 which is substantially identical to the original frame rail 50 of the van apparatus 20' is connected to the van apparatus 20', such that at this point in the assembly of a completed van apparatus 20', two frame rails of substantially identical construction are mounted one above the other on the van apparatus 20'. Attachment of the second frame rail 51 is achieved through the addition of a first metal piece 52 on the rear portion of the second frame rail 51 and a second metal piece 54 disposed at an approximately 45 degree angle on the front portion of the second frame rail 51. These metal pieces 52 and 54 allow the second frame rail 51 to extend upwardly such that it may connect with existing portions of the van apparatus 20 through the use of welds or similar constructs. Such welds or similar constructs may be strengthened through the use of additional metal pieces disposed within the existing structure. An example of such reinforcement through the use of metal structures is shown by the structure 56 which is used to strengthen the junction between 52 and 51.

When the second frame rail 51 has been attached as described above, the original frame rail 50 is cut from the van apparatus 20' and utilized as the second frame rail 51 of another van apparatus 20''. As will be apparent to one skilled in the art, fewer alignment problems occur in the construction of this embodiment than in the construction of the first embodiment of the present invention.

The floor portion 26' may then be lowered up to 10 inches beneath its previous location, and a metal skirt 30' placed substantially about the gap between the two positions. In this embodiment of the current invention, the floor portion 26' has been lowered seven inches, such that it may be placed in substantially horizontal alignment with the opening provided for the side doors 28' of the van body 24'. It will be appreciated that no height has been added to the van apparatus 20', such that it maintains a height substantially the same as standard vans, commonly under seven feet.

Another modification necessary to completion of the van apparatus 20' includes cutting the radius arm mounting bracket disposed beneath the engine of van apparatus 20' and turning said bracket sideways, such that the radius arm disposed in said bracket does not interfere with extension of the frame rail 51 in its lowered position. Body mounts (not shown) for the van apparatus 20' remain disposed in their original positions on the frame rail 51.

After all modifications have been completed on the van apparatus 20', a transfer case 58 for the transmission of said van apparatus 20' may be installed beneath the engine of said van apparatus 20', such that a drive shaft of the van apparatus 20' may extend in a substantially longitudinal fashion beneath the lowered portion 26' of the van apparatus 20'. The transfer case 58 connects the engine to the transmission of the drive shaft so that the drive shaft can extend under the floor.

It is to be understood that even though numerous characteristics and advantages of the present invention have been set forth in the foregoing description, together with details of the structure and function of the invention, the disclosure is illustrative only and changes may be made in detail, especially in matters of shape, size and arrangement of parts within the principles of the invention, to the full extent indicated by the broad general meaning of the terms in which the appended claims are expressed.

We claim:

1. A van apparatus, comprising
(a) a common rail support frame;
(b) wheels supporting the support frame above a surface of the ground;
(c) an engine driving the front wheels;
(d) a body resting on the support frame having a ceiling, bi-level floor, doors and windows;
(e) the bi-level floor including a lower floor portion and an upper floor portion supported by the common frame rail support frame disposed below both floor portions;
(f) at least one side door adapted to provide access to the lower floor portion by a wheelchair-bound person; and
(g) the lower floor portion of the bi-level floor extending in substantially the same plane from an intermediate rear passenger area to forward driver and front passenger areas of the van apparatus, such that a wheelchair-bound person has access to the driver area and front and rear passenger areas of the van and thus is able to drive or ride as a front or rear passenger while seated on the lower floor portion of the van apparatus.

2. A van apparatus in accordance with claim 1, wherein the lower floor portion has a floor to ceiling height such that a person sitting upright in a wheelchair has an unobstructed line of sight through the windows of the van in both the driver area and in the front and rear passenger areas.

3. A method of constructing a van apparatus for the transportation of handicapped people, comprising the steps of:
(a) modifying frame rails of a chassis by raising rear end portions of the chassis frame rails, such that the chassis has a midportion of lesser height than its front and rear end portions and by further adding an insert to increase the length of the midportion;
(b) mounting a van body to the two spaced apart, parallel frame rails of said chassis;
(c) cutting away a portion of a floor from said van apparatus;
(d) lowering said floor portion to a desired depth such that the floor portion is supported by the frame rail; and
(e) placing a metal skirt substantially about a gap between said lowered floor portion and the remaining floor surface of said van apparatus.

4. A method in accordance with claim 3 including the step of installing body mounts on the frame rails, the cut away floor portion resting on the body mounts.

5. A method in accordance with claim 4, wherein the chassis is selected from one of a General Motor® El Dorado Cadillac or Toronado Oldsmobile.

6. A method in accordance with claim 4, further including the step of extending the length of the side doors.

7. A method of constructing a van apparatus for the transportation of handicapped people comprising the steps of:
(a) cutting a portion of floor from said van apparatus;
(b) attaching a second frame rail structure to said van apparatus beneath an original frame rail;
(c) removing a portion of said original frame rail structure of said van apparatus disposed over said second frame rail structure;
(d) lowering said floor portion a desired depth through an opening created by removal of said original frame rail portion, such that said floor portion is supported by said second frame rail structure; and
(e) placing a metal skirt substantially about a gap between said lowered floor portion and the remaining floor surface of said van apparatus.

* * * * *

UNITED STATES PATENT AND TRADEMARK OFFICE
CERTIFICATE OF CORRECTION

PATENT NO. : 4,847,972

DATED : July 18, 1989

INVENTOR(S) : Anderson et al.

It is certified that error appears in the above-identified patent and that said Letters Patent is hereby corrected as shown below:

Col. 1, line 45, delete "has"

Col. 1, line 49-50, "aboveenumerated" should be --above-enumerated--

Col. 2, line 1, "sid" should be --said--

Col. 2, line 27, after "steps" insert --of--

Col. 2, line 61, after "present" insert --invention--

Col. 3, line 34, after "motors" insert --®--

Col. 4, line 34, "drawing" should be --drawings--

Col. 4, line 38, "Durado" should be --Dorado--

Col. 4, line 49, "20" should be --24--

Col. 6, line 16, "20" should be --20'--

Col. 7, line 29, after "height" insert --being--

UNITED STATES PATENT AND TRADEMARK OFFICE

CERTIFICATE OF CORRECTION

PATENT NO. : 4,847,972

DATED : July 18, 1989

INVENTOR(S) : Anderson et al.

It is certified that error appears in the above-identified patent and that said Letters Patent is hereby corrected as shown below:

Col. 8, line 17, "Motor" should be --Motors--

Signed and Sealed this

Twenty-fourth Day of July, 1990

*Attest:*

HARRY F. MANBECK, JR.

*Attesting Officer*

*Commissioner of Patents and Trademarks*